United States Patent
Oblizajek et al.

(10) Patent No.: US 7,765,858 B2
(45) Date of Patent: Aug. 3, 2010

(54) METHOD OF MEASURING TORSIONAL DYNAMICS OF A STEERING COLUMN AT SMALL DYNAMIC AMPLITUDES

(75) Inventors: Kenneth L. Oblizajek, Troy, MI (US); John D. Sopoci, Commerce Township, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 202 days.

(21) Appl. No.: 12/188,540

(22) Filed: Aug. 8, 2008

(65) Prior Publication Data

US 2010/0031739 A1 Feb. 11, 2010

(51) Int. Cl.
*G01M 17/06* (2006.01)
(52) U.S. Cl. .................................. 73/117.02
(58) Field of Classification Search ............... 73/117.02
See application file for complete search history.

(56) References Cited

U.S. PATENT DOCUMENTS

| | | | | |
|---|---|---|---|---|
| 3,762,491 A * | 10/1973 | Meyer | ...................... | 180/443 |
| 4,672,844 A * | 6/1987 | Meyer | ...................... | 73/117.02 |
| 5,700,951 A * | 12/1997 | Sagiyama et al. | .......... | 73/11.08 |
| 6,307,346 B1 * | 10/2001 | Downer et al. | .............. | 318/727 |
| 6,681,166 B2 * | 1/2004 | Kato et al. | ..................... | 701/41 |
| 6,999,862 B2 * | 2/2006 | Tamaizumi et al. | ........... | 701/41 |
| 7,350,395 B2 * | 4/2008 | Lee | ............................ | 73/11.07 |
| 7,590,502 B2 * | 9/2009 | Obata | ......................... | 702/113 |
| 7,684,912 B2 * | 3/2010 | Nishimura | ................... | 701/41 |
| 2005/0284245 A1 * | 12/2005 | Chen et al. | ............... | 74/388 PS |
| 2008/0033613 A1 * | 2/2008 | Tamaizumi et al. | .......... | 701/41 |
| 2009/0018726 A1 * | 1/2009 | Saruwatari et al. | ............ | 701/41 |
| 2010/0083744 A1 * | 4/2010 | Obata et al. | ............. | 73/117.02 |

\* cited by examiner

*Primary Examiner*—Lisa M Caputo
*Assistant Examiner*—Freddie Kirkland, III
(74) *Attorney, Agent, or Firm*—Quinn Law Group, PLLC

(57) ABSTRACT

A method for measuring low amplitude dynamic properties of a steering column includes mounting the steering column into a test fixture and performing test runs. The test runs include subjecting the input end of the steering column to input excitations and measuring output conditions, which include at least one of acceleration, velocity and position, and determining whether the output conditions are within a predetermined output range. Input excitations may include sinusoidal excitations having a selected frequency range, torque, or displacement; or dither excitations. The selected torque or displacement is determined using open loop calculations from the output conditions, to achieve target acceleration levels. Data is interpreted to determine the natural frequency or rim gain of the steering column, which are compared to predetermined permissible ranges. The maximum steering wheel rim gain permissible level may be equal to approximately 1 divided by the polar moment of inertia of the wheel.

20 Claims, 3 Drawing Sheets

METHOD OF MEASURING TORSIONAL DYNAMICS OF A STEERING COLUMN AT SMALL DYNAMIC AMPLITUDES

TECHNICAL FIELD

This disclosure relates to methods for testing dynamic properties of steering columns.

BACKGROUND OF THE INVENTION

As a vehicle is operated on a road, irregularities in the road surface induce movements of the vehicle's tires. These movements in turn are transmitted through the vehicle suspension to the vehicle interior. In some instances, these movements may be transferred from the road to the steering wheel, and may be discernable by the driver as unwanted vibrations.

In addition, there may be irregularities in rotating components located at corners of vehicles, such as imbalance, out of roundness and eccentricities in tires, wheels and brake rotors. These irregularities may also result in internal vehicular forces which produce movements that are transmitted to the vehicle interior. These movements are most notable on smooth roads as vibrations in proximity of the occupants for which an external source of the movement is not apparent. These vibrations, originating in irregularities of the rotating components, recur on subsequent rotations of the corners; and may be termed periodic. One particular type of periodic vibration involves torsional movement of the steering wheel and may be referred to as "smooth road shake."

SUMMARY

A method for measuring the dynamic properties of a steering column at low dynamic amplitudes is provided, the column or column assembly having an input end and an output end. The low dynamic amplitudes may be representative of operation of a vehicle on relatively smooth roads, or conditions indicative of smooth road shake. The method includes mounting the steering column into a test fixture and performing a first test run. The test run includes subjecting the input end of the steering column to a first set of input excitations and measuring a first set of output conditions at the output end resulting from the first set of input excitations. The output conditions including at least one of acceleration, velocity and position of the output end. Either the steering wheel or steering column base may be the output end. The method may then determine whether the first set of output conditions are within a predetermined or preselected output range.

Furthermore, the first set of input excitations may include sinusoidal excitations having a first selected frequency range and/or a first selected torque. The first selected torque may be determined using an open loop calculation from the first set of output conditions, in order to achieve a first target acceleration.

A second test run may be performed, including subjecting the input end of the steering column to a second set of input excitations, and measuring a second set of output conditions at the output end while the steering column is subjected to the second set of input excitations. The second set of output conditions may also include at least one of acceleration, velocity and position of the output end. A second selected torque may be determined for the second set of input excitations using another open loop calculation, in order to achieve a second target acceleration different from the first target acceleration.

Data from the first sets of input excitations and output conditions is interpreted to determine the natural frequency of the steering column being tested, and the natural frequency is compared to a predetermined natural frequency range. The first selected frequency range may be approximately 1 to 30 hertz, and the first and second target accelerations may be selected from a range of approximately 1 to 10 radians/second$^2$.

A further use of the test data includes determining a first steering wheel rim gain from said first set of output conditions and said first set of input excitations, and determining whether the first steering wheel rim gain is below a maximum permissible level. The steering wheel rim gain may be determined over a second selected frequency range which is different from the first selected frequency range, and the second selected frequency range may be equal to approximately 10 to 20 hertz. The maximum permissible level for the steering wheel rim gain may be equal to approximately 1 divided by the polar moment of inertia of the steering wheel.

The method may further include subjecting the input end to dither excitation during the first and/or second test runs. Additionally, the test runs may have a first selected displacement and frequency, and the natural frequency may be determined by fitting the first set of output conditions to a single degree of freedom equation, including at least one of spring constant, damping constant, and polar moment of inertia.

The above features and advantages and other features and advantages of the present invention are readily apparent from the following detailed description of the best modes and other embodiments for carrying out the invention when taken in connection with the accompanying drawings.

DESCRIPTION OF PREFERRED EMBODIMENTS

Figure 1:
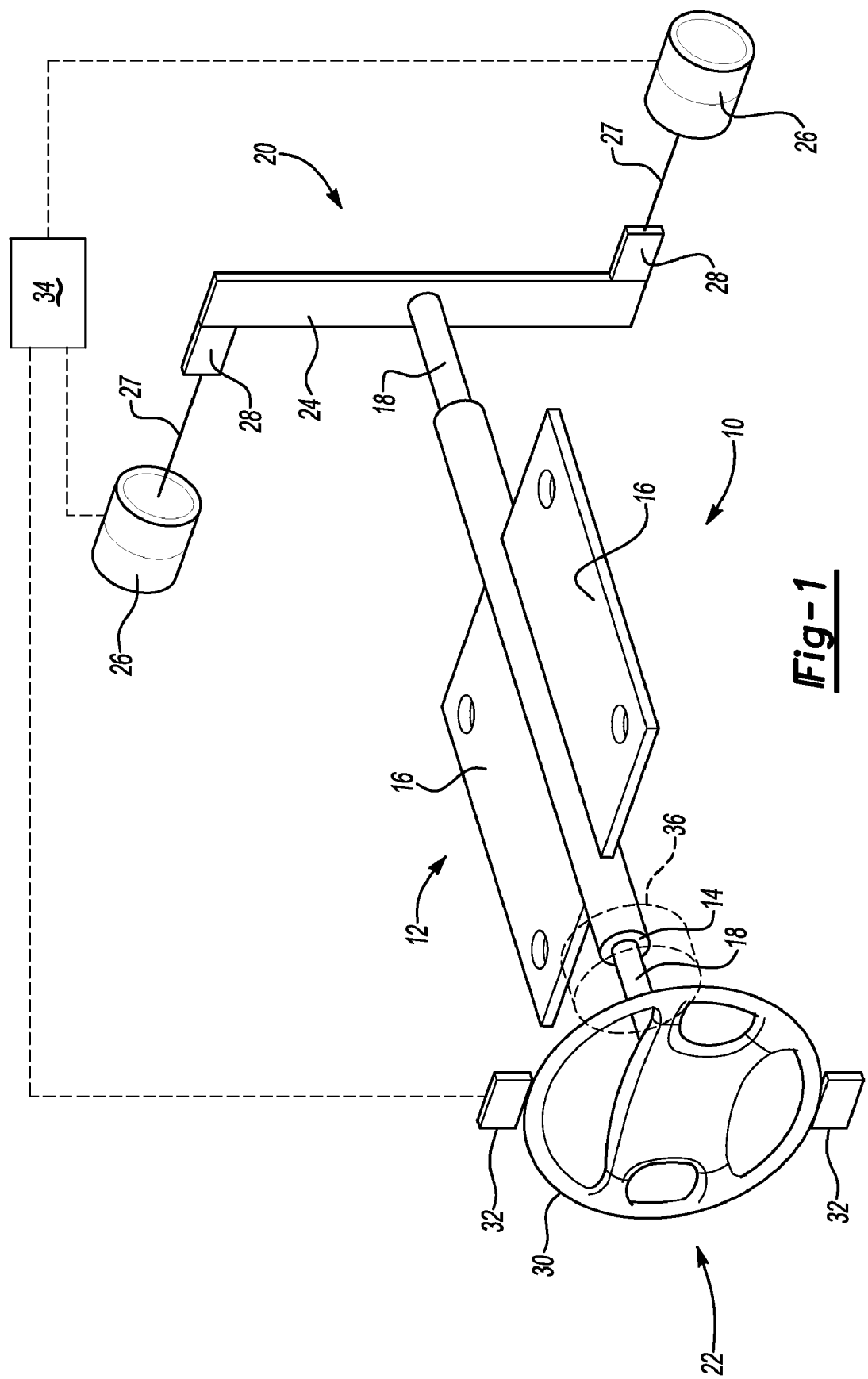
FIG. 1 is a schematic perspective view of a test fixture for measuring torsional dynamics of a steering column assembly.

Referring to the drawings, wherein like reference numbers correspond to like or similar components throughout the several figures, there is shown in the Figures a demonstrative, exemplary process for testing and measuring the dynamic properties of a steering column under low dynamic amplitudes which may be characteristic of smooth road shake. The test may be used to assist in proper component design and selection, which may result in a reduced level of vibration and reduced perception of vibration by the driver.

FIG. 1 shows a perspective view of a schematic depiction of a test fixture 10 which may be used in connection with the claim invention. A steering column assembly 12 is mounted or otherwise affixed to the test fixture 10 by a housing 16 which holds a bearing 14.

The steering column assembly 12 includes a steering shaft 18 supported by the bearing 14. By using the same housing 16 that attaches the steering column 12 to a vehicle (not shown), test fixture 10 may simulate the actual support structure, mounting points, and operating conditions of the steering column assembly 12 when installed in a vehicle. The steering column assembly 12 may contain additional bearings 14, such as to lend additional support for the steering shaft 18 at the opposite end of the housing 16, and many embodiments will contain two such bearings. Alternatively, a simulated housing (not shown) could be used to support the steering shaft 18 or the steering shaft 18 and bearing 14.

In the embodiment shown in FIG. 1, the test fixture 10 applies input excitations to an input end 20 of the steering column assembly 12 and measures the resulting conditions at an output end 22, which is generally opposite the input end 20. The input and output ends 20 and 22 need not be fixed relative to the steering column assembly 12, and the test fixture 10 may be configured to apply input excitations at either end of the steering column assembly 12 being tested.

The testing configuration shown in FIG. 1 includes an attachment arm 24 at the input end 20 to transfer the input excitations to the steering column assembly 12. This embodiment uses two excitation devices 26, such as electromagnetic shakers connected to the steering column assembly 12 using stingers 27, in order to impart forces at opposing ends of the attachment arm 24. Stingers 27 are long, slender rods featuring high bending compliance and low axial (concentric with symmetric body axis) compliance, as will be recognized by those having ordinary skill in the art.

The excitation devices 26 are configured such that the sum total of the input force vectors on the attachment arm 24 is zero. As such, the excitation devices 26 impart torque—about an axis running coaxially with the steering shaft 18—to the steering column assembly 12.

Those having ordinary skill in the art will recognize that the test fixture 10 need not use the exact type of excitation devices 26 shown in FIG. 1. For example, a torque motor could be used to impart a similar torque into the steering column assembly 12. In embodiments using a torque motor, the attachment arm 24 may not be necessary, as torque could be transferred directly (and coaxially) into the steering shaft 18 through a hub or splines (not shown). Still another example could involve the use of a single excitation device 26 (shaker and stinger) connected to the steering column assembly 12 at a distance from the steering shaft 18, imparting a torque about the steerable axis.

Excitation devices 26 are configured to variably subject the steering column assembly 12 to controlled periodic or oscillatory input excitations (a periodic forcing function). Periodic excitations may simulate vibration of the vehicle, and may be configured to simulate operation of the vehicle under smooth road shake conditions. In one embodiment of the test, the excitation devices 26 are configured to input periodic or oscillatory excitations having an input frequency range variable from approximately 1 to 30 hertz (Hz). Throughout this disclosure and attached drawings, frequency may be abbreviated as "f". Those having ordinary skill in the art will recognize that input excitations need not be perfectly periodic, and may include force and displacement applied at irregular intervals.

Additionally, dither may also be applied to further simulate operation of the steering column assembly 12 in the vehicle in response to movements on apparently smooth, but nonetheless irregular, roads (smooth road shake). In the case of excitation simulating engine and transmission sources, dither excitation may include broadband random noise, or band-limited or otherwise shaped and spectrally-rich random or quasi-periodic excitation. Dither may also contain low frequency content simulating normal driver steering correction typical of operation of the vehicle. The concurrent application of these dither excitations and subsequent decomposition of the vibratory responses—yielding characterization of critical, coherent responses to the periodic or oscillating input excitations—may result in further simulation of smooth road shake and driver response operating conditions.

In addition to varying the input frequency, the excitation devices 26 may vary the input force or torque to the attachment arm 24 (or directly input to the steering shaft 18). Depending upon the type of excitation device 26 used, and the method of controlling the input excitations, the attachment arm 24 may be equipped with force transducers 28, which are capable of measuring the force input by each excitation device 26 on the attachment arm 24.

Those having ordinary skill in the art will recognize other ways to control and measure input force or torque. The excitation devices 26 may be configured to self-monitor the force or torque used to impart the periodic input excitations. Note that in the embodiment shown in FIG. 1, the force transducers 28 may also be used to calculate torque on the attachment arm 24 by multiplying the measured force by the distance at which it is applied from the center of the attachment arm 24: Torque=Force×Distance.

On the opposite end of the steering column assembly 12, relative to the bearing 14, is the output end 22. A steering wheel 30 is attached to the steering shaft 18 to emulate the conditions and set up of a production steering column assembly in a production vehicle.

One or more accelerometers 32 may be attached to the rim (outer portion) of steering wheel 30 to measure the angular acceleration of steering wheel 30 during the test. Alternatively, position or velocity-responsive sensors (not shown) could be placed on the rim of the steering wheel 30 to measure the angular position, linear displacement or velocity of steering wheel 30 during the test. Those having ordinary skill in the art will recognize that angular displacement, velocity, and acceleration may also be calculated from measurements of any one of the three.

In an alternative test configuration, the steering wheel 30 may be replaced with an equivalent bar (not shown), to which the accelerometers 32 would be attached. In order to simulate the production steering column assembly 12 for the test, the equivalent bar may be designed or configured to have a polar moment of inertia (PMI) approximately equivalent to the PMI of the steering wheel 30. PMI of the equivalent bar may be calculated using the following formula:

$$PMI_{equiv} = \frac{1}{12}m(a^2 + b^2)$$

where m is mass (in kilograms), and a and b are the width and length of the bar, respectively (in meters).

A control system 34 may be utilized to control the excitation devices 26 and measure, log, or monitor data from the excitation devices 26, force transducers 28, accelerometers 32, and any other conditions monitored during the testing process. Some embodiments of the steering column assembly 12 may include a column electrical assembly (CEA) 36 (shown in phantom), which may house the turn signal levers, headlight and wiper controls, anti-theft equipment, quasi-electrical commutator (clockspring), and other controls and electrical components for the steering column assembly 12.

Figure 2:
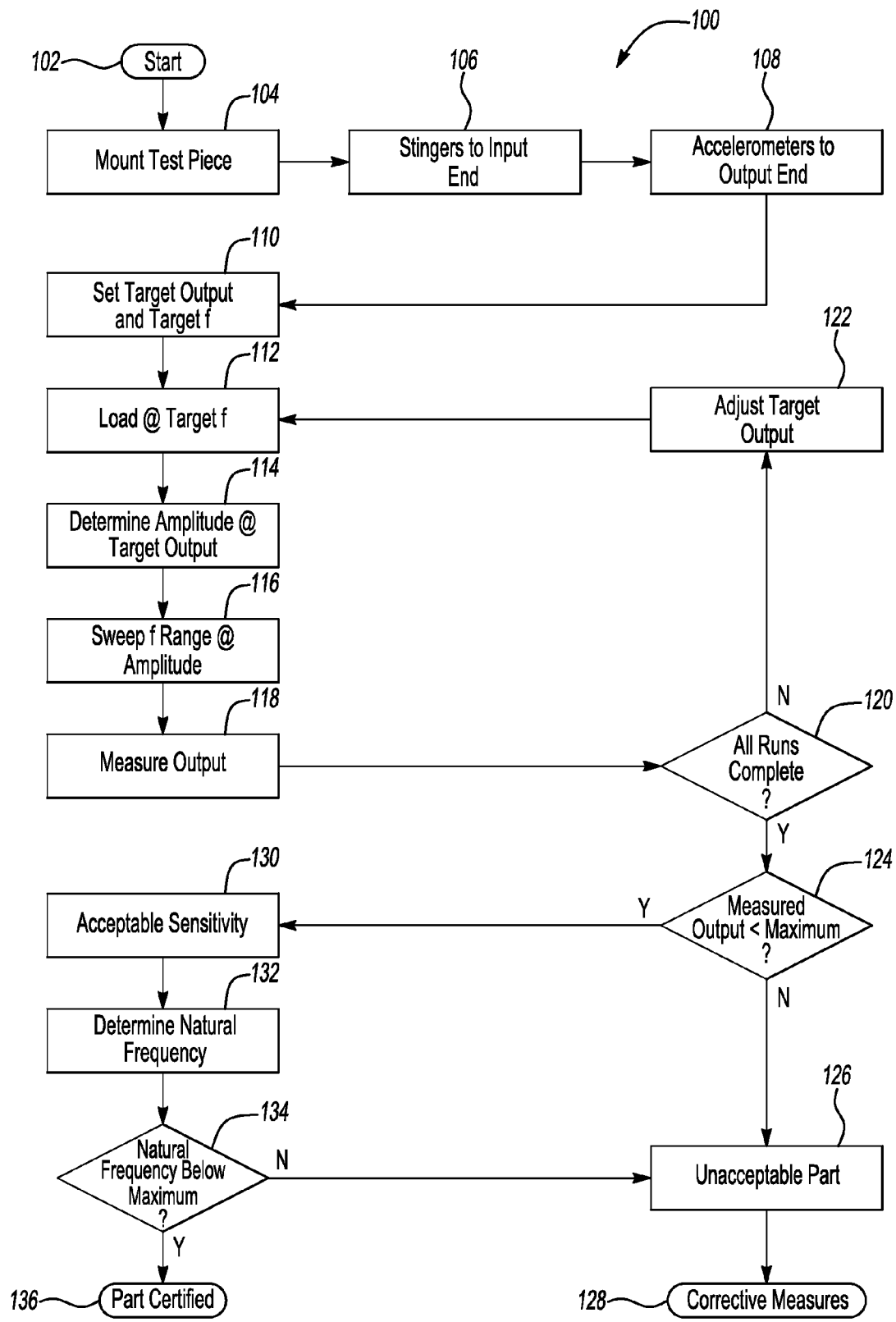
FIG. 2 is a flow chart of a method of measuring torsional dynamics of a steering column at small dynamic amplitudes.

Referring now to FIG. 2, there is shown a schematic flow chart of one embodiment of an algorithm or method 100 for testing, measuring and analyzing the dynamic properties of a steering shaft (such as 18) and bearings (14), or steering column assembly (12). Much of the method 100 may, but need not necessarily, be implemented with the components and elements of the test fixture 10 described herein. For descriptive purposes, method 100 is described with reference to some elements of the test fixture 10.

Method 100 begins at a start step 102, at which equipment is gathered and prepared for proper and safe operation; electronics are initialized and calibrated; and the test piece or pieces (such as steering column assembly 12) are gathered and inspected for safety and suitability for the test. At step 104, the test piece, steering column assembly 12, is mounted to the test fixture 10. Mounting may occur by affixing the housing 16 to the test fixture 10, or by affixing the bearing 14 directly to the test fixture 10—such as by a simulated housing structure.

At steps 106 and 108, the excitation devices 26 and accelerometers 32 are attached to the input end 20 and output end 22, respectively. Depending upon the data sought, the input end 20 may be either the attachment arm 24 or the steering wheel 30. Furthermore, the method 100 may include multiple runs or iterations and the input and output ends 20 and 22 may be reversed for a portion of the runs or iterations—by attaching the excitation devices 26 to the steering wheel 30 and accelerometers 32 to the attachment arm 24 or some other component on that end of the steering column assembly 12—such that testing results include data with excitation from both ends of the steering column assembly 12.

Once the steering column assembly 12 is properly mounted to the test fixture 10, a first target output is set in step 110, either by programming the target into the control 34 or by alerting the operator of test fixture 10. The target output may be selected from a range configured to approximate smooth road shake conditions occurring when the steering column assembly 12 is installed in a vehicle. Target output may be angular displacement, velocity, or acceleration. Additionally, a target frequency (Target f), at which the first target output will be measured, may also be set in step 110. The excitation devices 26 (or single excitation device, such as a torque motor) begin subjecting the input end 20 to inputting excitations at the target frequency during step 112.

Those having ordinary skill in the art will recognize that periodic forcing or loading functions have both frequency and amplitude components. Method 100 demonstrates one way in which the amplitude can be selected for the test. Step 114 varies the input amplitude—while the steering column assembly 12 is loaded at the target frequency—until the position sensors or accelerometers 32 notify the control 34 or the operator that the output end 22 has reached the first target output set in step 110. Input amplitude may be measured and controlled as angular displacement, velocity, acceleration, or as torque. In the embodiment shown in FIG. 2, the input amplitude is a controlled input torque.

The input amplitude (torque, displacement, velocity, or acceleration) determined in step 114 is then used as a constant amplitude while the input excitations are varied or swept over a frequency range (f Range) in step 116. For example, where the amplitude is controlled by adjusting torque from the excitation devices 26, as shown in FIG. 2, the torque measured at the first target output will remain substantially constant while the input frequency is varied over the frequency range.

While the input frequency is swept over the frequency range, the control 34 logs, stores, or displays the output conditions as a function of the frequency in step 118 (an example is shown plotted or graphed in FIG. 3, discussed in more detail below). Those having ordinary skill in the art will recognize that other input data may be logged or calculated and method 100 is not limited to comparison or analysis of output conditions as a function of frequency only.

The frequency range swept in steps 116 and 118 may be varied at any rate and method known to those having ordinary skill in the art as capable of collecting sufficient data, taking the sampling rate of control 34 into account. For example, and without limitation, sine-dwell or swept-sine methods may be used. Testing and measuring the steering column assembly 12 over the swept frequency range in steps 116 and 118 may be referred to as the first test run.

Following completion of first test run, decision step 120 then determines whether or not further test runs are planned or required. Step 120 may occur by checking a pre-programmed test schedule—containing the total number of required runs and operating conditions for each—in the control 34, or an operator may determine whether further runs are needed based upon the output measured in step 118.

In one embodiment of the method 100, at least three test runs are logged for test of the steering column assembly 12. For example, and without limitation, three test runs with different input amplitude may be logged in order to simulate three different levels of smooth road shake. If decision step 120 determines that all test runs are not complete, method 100 moves to step 122, in which the target output is adjusted to a second target output level which may be different from the first target output level set in step 110.

The method 100 proceeds to determine the amplitude needed to reach the second target output level in steps 112 and 114, and then tests and measures the steering column assembly 12 at the new amplitude in steps 116 and 118. If a third test run is planned, the step 122 again adjusts the target output, this time to a third target output level, and the loading, testing and measuring in steps 112-118.

One embodiment of the method 100 and test fixture 10, measures output as angular acceleration from the accelerometers 32 and controls (and logs) amplitude of the input excitations from the excitation devices 26 as torque. Those having ordinary skill in the art will recognize variations on the above that may be used within the scope of the appended claims, such as, without limitation: measuring angular or linear position or angular or linear velocity of the steering wheel 30 (or equivalent bar) as the output and controlling the amplitude of the input excitations with constant displacement of the excitation devices. In embodiments using three test runs, the first, second and third target outputs may be set at approximately: 2.5, 5.0, and 7.5 radians/second$^2$, respectively.

An alternative step, not shown in FIG. 2, may include reconfiguring orientation of the steering column assembly 12 in the test fixture 10. This alternative step may be used to apply input excitations to the opposite end of the steering column assembly 12 and obtain further data. After re-mounting the steering column assembly 12 in steps 104-108, the method 100 would proceed to cycle through steps 110-120 until similar data is logged for the reversed test piece.

Similarly, the steering column assembly 12 may be reconfigured by adding or removing auxiliary components, such as the CEA 36. Reconfigurations and alterations of the steering column assembly 12 and test fixture 10 will continue, with steps 104-120 and 122 running substantially as described above, until all planned or desired test runs and configurations have been completed (and the related data collected).

Once all planned or needed test runs (and possible reconfigurations) are complete, decision step 120 stops testing the steering column assembly 12 advances the method 100 to steps which process or interpret test data. The remainder of method 100 is configured to determine whether or not the steering column assembly 12 satisfies quality, performance, or design standards.

Decision step 124 compares the measured output conditions to a maximum permissible level. Those having ordinary skill in the art will recognize that the maximum permissible level may be set based upon, for example and without limitation, design constraints of the vehicle or predicted comfort levels of the vehicle driver. In embodiments where the measured output conditions logged are angular acceleration, this data may further be manipulated by computing the system sensitivity or gain as the angular acceleration divided by the torque for the test run over the swept frequency range.

Figure 3:
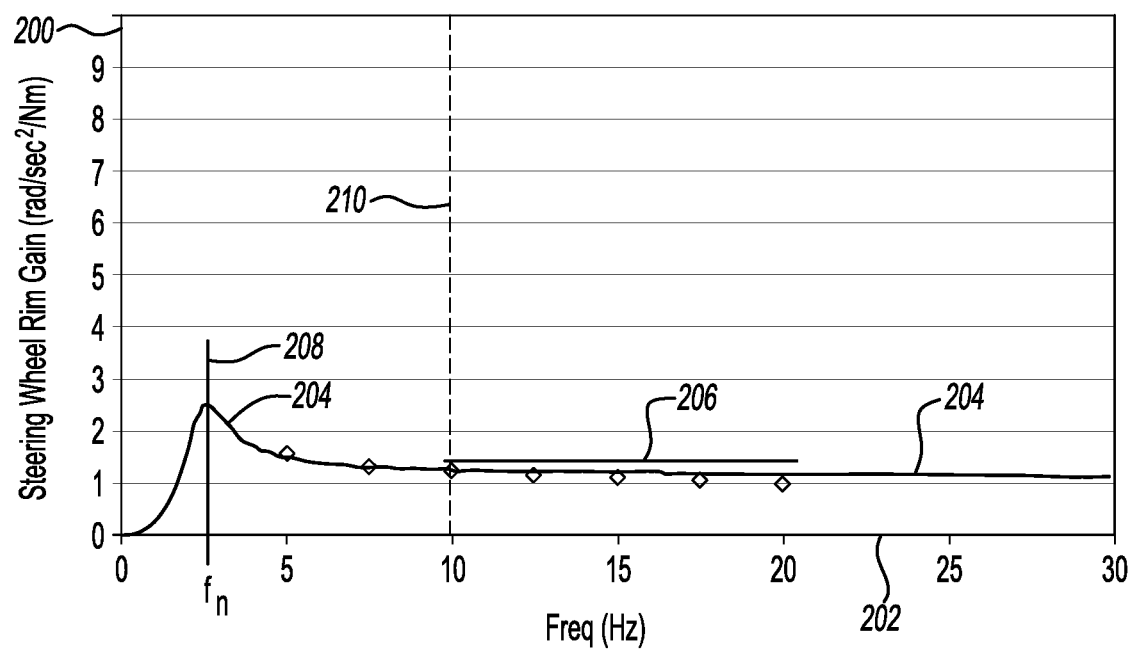
FIG. 3 is an exemplary graph of output conditions as a function of input excitations, in this case gain as a function of frequency.

Referring now to FIG. 3, there is shown an exemplary plot of the output conditions, expressed as system sensitivity along the y-axis 200 versus the input frequency along the x-axis 202. Result line 204 graphically shows the measured sensitivity as a function of input frequency for over a test run having an input frequency range swept from approximately 0-30 Hz.

Decision step 124 may compare the measured system sensitivity to the maximum permissible level as an absolute maximum or as a maximum over a specific portion of the swept frequency range. FIG. 3 shows a maximum sensitivity line 206 over a portion of the swept frequency range, from approximately 10-20 Hz. In the example shown in FIG. 3, because result line 204 is below maximum sensitivity line 206, decision step 124 would have a positive answer.

As shown in FIG. 3, depending upon the type of test being conducted using method 100, decision step 124 may be executed in multiple ways. The control 34 or a subsequent computer process may compare the data (shown as result line 204) to the maximum permissible level and determine whether the measured output is less than the maximum and alert or warn the test engineer. Alternatively, and useful for testing individual parts for errors in a production line, the results may be displayed graphically on a monitor (not shown) and visually compared to the maximum permissible level by the operator of the test fixture 10.

Where decision step 124 determines that the measured output conditions are not below the threshold permissible level, the method 100 moves to step 126 and has determined that the part is unacceptable—either the specific steering column assembly 12 being tested, or the design of the steering column assembly 12 in general. Note that decision step 124 may incorporate all data from all of the test runs and make the decision based upon an average or other statistical compilation of the runs, or may individually compare the results of each test run to the maximum permissible level.

After the part is determined to be unacceptable in step 126, method 100 may further include taking corrective action in step 128. Such corrective measures may include stopping the production process to discover the source of manufacturing errors, or may include redesigning the steering column assembly 12 to alter its dynamic properties at small amplitudes.

If decision step 124 determines that the measured output (such as the sensitivity at the steering wheel 30) is below the maximum permissible level, the sensitivity is acceptable, as shown at step 130. In some embodiments of the method 100, satisfaction of the sensitivity requirements may demonstrate that the steering column assembly 12 has been designed or manufactured properly, and at step 136 the design may be certified for production or the part certified for assembly into a production vehicle.

In order to further verify the design or performance of the steering column assembly 12 being tested, the method 100 may include determining the natural frequency ($f_n$) of the steering column assembly 12 (and all components attached during the test, test run, or iteration) at step 132. Natural frequency may be approximated by fitting the data collected from the test runs to a single degree of freedom equation, and interpreting the fitted parameters:

$$H = \frac{-\omega^2}{(K - I\omega^2) + (C\omega + K'')i}$$

where:
$\omega = 2\pi f$
H is system sensitivity (rad/sec$^2$/Nm)
f is frequency (Hz)
$i = \sqrt{-1}$
I is the polar moment of inertia
K is the spring constant, or effective stiffness
C is the viscous damping constant, when C>0
K" is the structural damping constant The term K"+Cw may also represent frequency dependent structural damping when C<0. In all cases, K, I and the combined term K"+Cw, must be positive parameters.

The natural frequency determined in step 132 may be used as a further quality control or validation tool. At decision step 134, the natural frequency is compared to a maximum value. If the natural frequency is below the maximum value, the steering column assembly 12 also satisfies this standard and the method 100 moves to step 136 where the part may be certified.

Referring again to FIG. 3, the natural frequency of the test run represented by results line 204 is shown at line 208. The maximum natural frequency is shown as line 210 is approximately 10 Hz. As demonstrated in FIG. 3, the results of this test data show that the natural frequency 208 of the steering column assembly 12 tested is below the maximum line 210, and therefore satisfies the standard. As such, decision step 134 will be answered affirmatively and move method 100 to step 136, where the part may be certified. Additional testing steps may include the addition of dither to the steering column assembly 12 and subsequent processing of the resulting data to determine compliance with the output condition standards; such as gain, natural frequency, or other measured or calculated output conditions.

While the best modes and other embodiments for carrying out the claimed invention have been described in detail, those familiar with the art to which this invention relates will recognize various alternative designs and embodiments for practicing the invention within the scope of the appended claims.

The invention claimed is:

1. A method for measuring the dynamic properties of a steering column having an input end and an output end, the steering column being measured under low dynamic amplitudes, representative of operation of a vehicle on relatively smooth roads, comprising:
   mounting the steering column into a test fixture;
   performing a first test run, including:
      subjecting the input end of the steering column to a first set of input excitations; and
      measuring a first set of output conditions at the output end while the steering column is subjected to said first set of input excitations, said first set of output conditions including at least one of an acceleration, a velocity and a position of the output end; and
   determining whether said first set of output conditions is within a predetermined output range.

2. The method of claim 1, wherein said first set of input excitations includes sinusoidal excitations having a first selected frequency range.

3. The method of claim 2, wherein said first set of input excitations further includes sinusoidal excitations having a first selected torque.

4. The method of claim 3, further comprising determining said first selected torque for said first set of input excitations using an open loop calculation from said first set of output conditions, in order to achieve a first target acceleration.

5. The method of claim 4, further comprising performing a second test run, including:
subjecting the input end of the steering column to a second set of input excitations; and
measuring a second set of output conditions at the output end while the steering column is subjected to said second set of input excitations, said second set of output conditions including at least one of an acceleration, a velocity and a position of the output end.

6. The method of claim 5, further comprising determining a second selected torque for said second set of input excitations using another open loop calculation from said second set of output conditions, in order to achieve a second target acceleration different from said first target acceleration.

7. The method of claim 6, further comprising:
interpreting said first set of output conditions and said first set of input excitations to determine a natural frequency of the steering column; and
determining whether said natural frequency is within a predetermined natural frequency range.

8. The method of claim 7, wherein said first selected frequency range is equal to approximately 1 to 30 hertz.

9. The method of claim 8, wherein said first and second target accelerations are selected from a range of approximately 1 to 10 radians/second$^2$.

10. The method of claim 9, further comprising:
determining a first steering wheel rim gain from said first set of output conditions and said first set of input excitations; and
determining whether said first steering wheel rim gain is below a maximum permissible level.

11. The method of claim 10, wherein said first steering wheel rim gain is determined over a second selected frequency range different from said first selected frequency range.

12. The method of claim 11, wherein said second selected frequency range is equal to approximately 10 to 20 hertz.

13. The method of claim 12, wherein said maximum permissible level is equal to approximately 1 divided by the polar moment of inertia of the steering wheel.

14. The method of claim 13, wherein said first and second test runs further include subjecting the input end to dither excitation.

15. A method for measuring the dynamic properties of a steering column having an input end and an output end, the steering column being measured under low dynamic amplitudes, representative of operation of a vehicle on relatively smooth roads, comprising:
mounting the steering column into a test fixture;
performing a first test run, including:
subjecting the input end of the steering column to a first set of input excitations, wherein said first set of input excitations includes sinusoidal excitations having a first selected frequency range and a first selected displacement, and
measuring a first set of output conditions at the output end while the steering column is subjected to said first set of input excitations, wherein said first set of output conditions includes at least one of an acceleration, a velocity and a position of the output end; and
determining whether said first set of output conditions is within a predetermined output range.

16. The method of claim 15, wherein said first selected displacement is determined by an open loop calculation from said first set of output conditions.

17. The method of claim 16, further comprising:
interpreting said first set of output conditions and said first set of input excitations to determine a natural frequency of the steering column; and
determining whether said natural frequency is within a predetermined natural frequency range.

18. The method of claim 17, further comprising:
determining a first steering wheel rim gain from said first set of output conditions and said first set of input excitations; and
determining whether said first steering wheel rim gain is below a maximum permissible level.

19. The method of claim 18, wherein said maximum permissible level is equal to approximately 1 divided by the polar moment of inertia of the steering wheel.

20. The method of claim 19, wherein said natural frequency is determined by fitting said first set of output conditions to a single degree of freedom equation, including at least one of a spring constant, a damping constant, and a polar moment of inertia.

* * * * *